(12) United States Patent
Yamano et al.

(10) Patent No.: US 11,592,223 B2
(45) Date of Patent: Feb. 28, 2023

(54) FREE COOLING OUTDOOR UNIT

(71) Applicant: Mitsubishi Electric Corporation, Tokyo (JP)

(72) Inventors: Yoshio Yamano, Tokyo (JP); Takahito Hikone, Tokyo (JP); Kimitaka Kadowaki, Tokyo (JP); Takuya Ito, Tokyo (JP); Yasushi Okoshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 175 days.

(21) Appl. No.: 16/973,834

(22) PCT Filed: Aug. 17, 2018

(86) PCT No.: PCT/JP2018/030532
§ 371 (c)(1),
(2) Date: Dec. 10, 2020

(87) PCT Pub. No.: WO2020/035941
PCT Pub. Date: Feb. 20, 2020

(65) Prior Publication Data
US 2021/0247118 A1  Aug. 12, 2021

(51) Int. Cl.
*F25B 41/20* (2021.01)
*F25B 49/00* (2006.01)
*F25B 25/00* (2006.01)

(52) U.S. Cl.
CPC .......... *F25B 49/005* (2013.01); *F25B 25/005* (2013.01); *F25B 41/20* (2021.01); *F25B 2500/31* (2013.01)

(58) Field of Classification Search
CPC ...... F25B 49/005; F25B 41/20; F25B 25/005; F25B 2500/31
See application file for complete search history.

(56) References Cited

U.S. PATENT DOCUMENTS 4,608,836 A * 9/1986 MacCracken ........... F25D 17/02
165/59
6,253,566 B1 * 7/2001 Ichikawa ................ F28D 9/005
62/434

FOREIGN PATENT DOCUMENTS

JP   H07-234055 A   9/1995

OTHER PUBLICATIONS

International Search Report of the International Searching Authority dated Nov. 6, 2018 for the corresponding International application No. PCT/JP2018/030532 (and English translation).

* cited by examiner

*Primary Examiner* — Nael N Babaa
(74) *Attorney, Agent, or Firm* — Posz Law Group, PLC

(57) ABSTRACT

A free cooling outdoor unit includes: a refrigerant circuit through which refrigerant circulates; a brine circuit through which brine circulates; a water circuit through which water circulates; a fan configured to send air to the second heat exchanger; a flow control valve configured to control a circulation amount of the brine in the brine circuit; a water temperature detection sensor configured to detect a water temperature in the water circuit; an outside air temperature sensor; and a controller configured to control, where the outside air temperature is equal to or lower than a freezing temperature of the brine, the circulation amount of the brine based on the water temperature such that a brine temperature is prevented from reaching a temperature equal to or lower than the freezing temperature of the brine.

6 Claims, 2 Drawing Sheets

FREE COOLING OUTDOOR UNIT

CROSS REFERENCE TO RELATED APPLICATION

This application is a U.S. national stage application of PCT/JP2018/030532 filed on Aug. 17, 2018, the contents of which are incorporated herein by reference.

TECHNICAL FIELD

The present disclosure relates to a free cooling outdoor unit in which brine is used as a heat medium.

BACKGROUND ART

Hitherto, a free cooling outdoor unit utilizing natural energy has been used in order to realize energy saving (see, Patent Document 1, for example).

In the free cooling outdoor unit disclosed in Patent Document 1, heat exchange units are disposed in a cooling tower provided with a fan, in which each heat exchange unit is formed by arranging a cooling water coil that cools water being an object to be cooled (hereinafter referred to as "cooling water") and a condenser coil that cools refrigerant for a refrigerator in the same plate fin tube heat exchanger, and the cooling water or the refrigerant is cooled in the cooling tower. Water that is subjected to heat exchange by external equipment, and heated to have a high temperature is cooled with cooling water or refrigerant that has been cooled, and the cooled water is again sent back to the external equipment.

When the free cooling outdoor unit as described above is installed in a cold district or the like, a brine mixed with an additive to lower the freezing point is used to prevent cooling water from freezing, but the concentration of the additive (hereinafter referred to as "brine concentration") was determined taking into account the lowest temperature of a site of installation.

CITATION LIST

Patent Literature

Patent Literature 1: Japanese Unexamined Patent Application Publication No. H07-234055

SUMMARY OF INVENTION

Technical Problem

The related-art free cooling outdoor unit described in Patent Document 1 has a problem that, when the brine concentration is high, heat exchange efficiency is lowered as compared with a case where the brine concentration is low, and in addition, due to an increase in viscosity, pump power is required, thus leading to a lowering in energy efficiency.

The present disclosure has been made to solve the above problems, and an object thereof is to provide a free cooling outdoor unit capable of preventing freezing of brine and improving energy efficiency.

Solution to Problem

A free cooling outdoor unit according to an embodiment of the present disclosure includes: a refrigerant circuit where a compressor, a first heat exchanger, a throttle device, and a refrigerant flow passage of a first water heat exchanger are connected by pipes so as to cause refrigerant to circulate therein; a brine circuit wherein a brine pump, a second heat exchanger, and a brine flow passage of a second water heat exchanger are connected by pipes so as to cause brine to circulate therein; a water circuit where a water pump, a water flow passage of the second water heat exchanger, and a water flow passage of the first water heat exchanger are connected by pipes so as to cause water to circulate therein; a fan configured to send air to the second heat exchanger; a flow control valve configured to control a circulation amount of the brine in the brine circuit; a water temperature detection sensor configured to detect a water temperature in the water circuit; an outside air temperature sensor configured to detect an outside air temperature; and a controller configured to control, in a case where the outside air temperature is equal to or lower than a freezing temperature of the brine, the circulation amount of the brine based on the water temperature such that a brine temperature is prevented from reaching a temperature equal to or lower than the freezing temperature of the brine.

According to the free cooling outdoor unit of the present disclosure, when the outside air temperature is equal to or lower than the brine freezing temperature, the circulation amount of brine is controlled so that the brine temperature does not become lower than the brine freezing temperature based on the water temperature of the water circuit. Therefore, the brine concentration in the brine circuit can be made lower than before, and the brine can be prevented from freezing and energy efficiency can be improved.

DESCRIPTION OF EMBODIMENTS

Embodiment of the present disclosure will be described with reference to the drawings. The disclosure is not limited by Embodiment described below. In the following drawings, the relationship between the sizes of the components may differ from the actual one.

Embodiment

Figure 1:
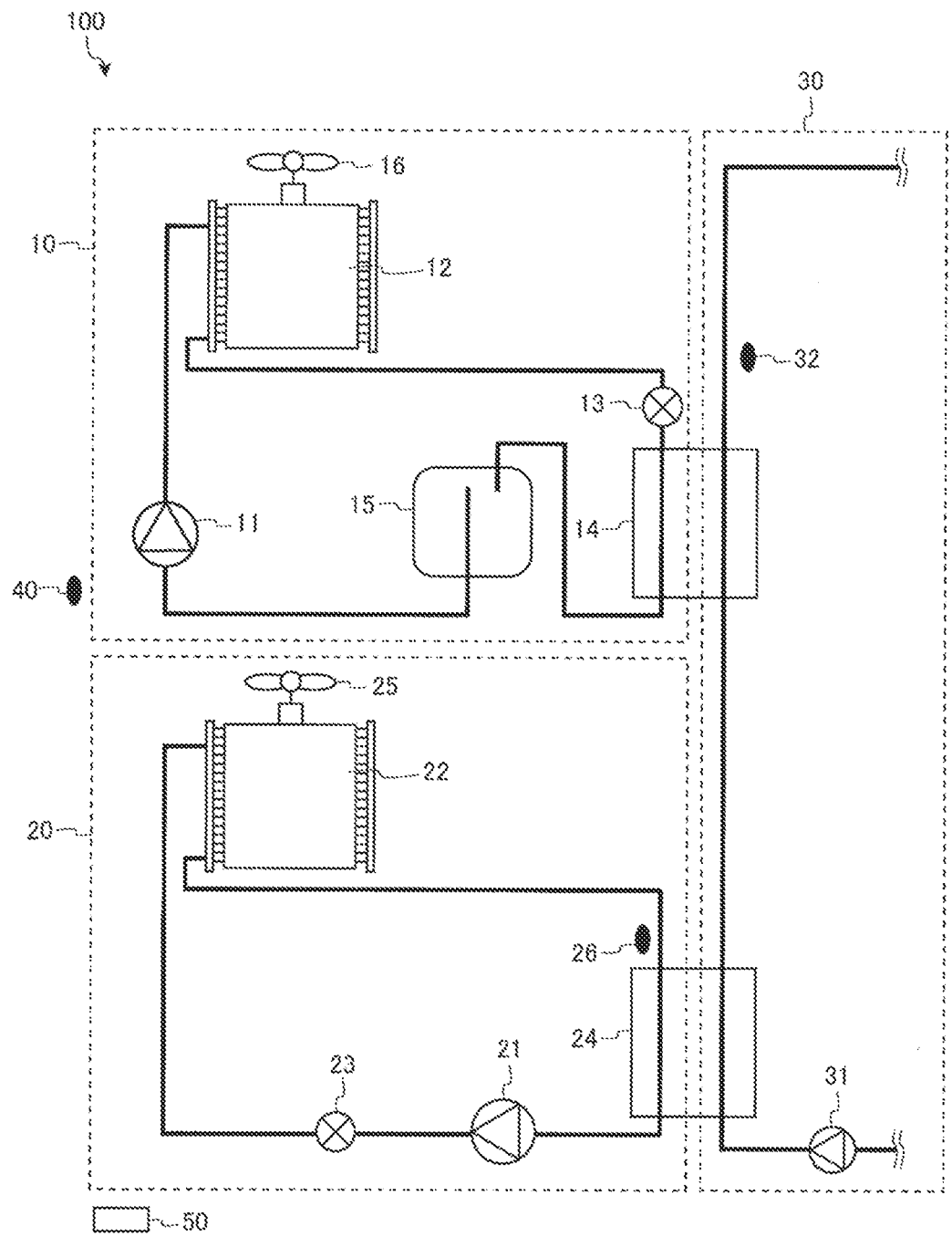
FIG. 1 is a diagram illustrating the configuration of a free cooling outdoor unit according to Embodiment 1.

FIG. 1 is a configuration diagram of a free cooling outdoor unit 100 according to an embodiment of the present disclosure.

As shown in FIG. 1, the free cooling outdoor unit 100 of Embodiment has a refrigerant circuit 10 for chiller operation, a brine circuit 20 for free cooling operation, a water circuit 30 in which water to be cooled (hereinafter referred to as "cooling water") circulates, and a controller 50.

The refrigerant circuit 10 includes a compressor 11, a first heat exchanger 12, a throttle device 13, a refrigerant flow passage of the first water heat exchanger 14, and an accumulator 15 being connected serially by pipes to cause the refrigerant to circulate in the circuit. In the vicinity of the first heat exchanger 12, a first fan 16 for sending air to the first heat exchanger 12 is provided.

The brine circuit 20 includes a brine pump 21, a flow control valve 23, a second heat exchanger 22, and a brine flow passage of the second water heat exchanger 24 connected serially by pipes, and the brine mixed with an additive that lowers the freezing point to the water circulates in the circuit. In the vicinity of the second heat exchanger 22, a second fan 25 for sending air to the second heat exchanger 22 is provided.

The water circuit 30 includes the water pump 31, the water flow passage of the second water heat exchanger 24, and the water flow passage of the first water heat exchanger 14 being connected serially by pipes, and cooling water circulates in the circuit. The second water heat exchanger 24 is arranged on the upstream side of the first water heat exchanger 14.

The compressor 11 suctions refrigerant, compresses the refrigerant to a high-temperature and high-pressure state and discharges the compressed refrigerant. The compressor has, for example, an inverter circuit, that can control the capacity of the compressor by changing its rotation speed. The first heat exchanger 12 causes heat exchange to be performed between refrigerant and air sent from the first fan 16, to thereby cool the refrigerant. The throttle device 13 depressurizes the refrigerant. Most preferably, the throttle device 13 is a flow control unit such as an electronic expansion valve or the like, of which the opening degree can be changed variably, and can control the flow rate of the refrigerant passing through the flow control unit, but may also be refrigerant flow control units such as capillaries, expansion valves and the like. The first water heat exchanger 14 causes heat exchange to be performed between refrigerant and cooling water flowing through the water circuit 30, to thereby cool the cooling water. In the first water heat exchanger 14, the direction of the flow of the refrigerant is opposite to the direction of the flow of the cooling water, but this is not limited to the direction of the flow of the refrigerant in the first water heat exchanger 14, but the direction of the flow of the refrigerant may be in parallel to the direction of the flow of the cooling water. The accumulator 15 stores surplus refrigerant in the refrigerant circuit 10.

The brine pump 21 pressurizes brine in the brine circuit 20 and transfers the brine through the circuit. For example, the brine pump has an inverter circuit and is of a type that can change the speed of rotation and vary the flow rate. A second heat exchanger 22 causes heat exchange to be performed between brine and air sent from the second fan 25 to cool the brine. The flow control valve 23 is, for example, an electronic expansion valve, of which the opening degree can be changed variably, and that can control the flow rate of brine circulating through the brine circuit 20 (hereinafter referred to as "circulation amount of brine") by controlling the flow rate of brine that passes through the flow control valve 23. The position of the flow control valve 23 is not limited to between the brine pump 21 and the second heat exchanger 22, but is preferably located downstream of the brine pump 21. The second water heat exchanger 24 causes heat exchange to be performed between brine and cooling water flowing through the water circuit 30, to thereby cool the cooling water. In the second water heat exchanger 24, the direction of flow of the brine is opposite to the direction of flow of the cooling water. Thus, by flowing the brine in a direction opposite to the direction in which the cooling water flows, the heat exchange efficiency can be improved because the temperature difference can be ensured.

The water pump 31 pressurizes cooling water in the water circuit 30, and transfers the cooling water in the circuit. For example, the water pump 31 is a constant rate type water pump in which a rotation speed is constant.

The controller 50 controls the rotation speed of the compressor 11, the opening degree of the throttle device 13, the rotation speed of the first fan 16, the rotation speed of the brine pump 21, the opening degree of the flow rate adjusting valve 23, the rotation speed of the second fan 25, the rotation speed of the water pump 31 and the like. The controller 50 includes, for example, dedicated hardware or a CPU (also referred to as a central processing unit, a processing unit, an arithmetic unit, a microprocessor, a microcomputer, or a processor) that executes a program stored in a memory.

An outside air temperature sensor 40 that detects an outside air temperature is provided to an external part of the housing (not shown) of the free cooling outdoor unit. A water temperature detection sensor 32 that detects a water temperature is provided near the outlet of the water flow passage of the first water heat exchanger 14 of the water circuit 30. A brine temperature detection sensor 26 that detects brine temperature is provided near the outlet of the brine flow passage of the second water heat exchanger 24. The outdoor air temperature sensor 40, the water temperature detection sensor 32, and the brine temperature detection sensor 26 are, for example, thermistors.

Figure 2:
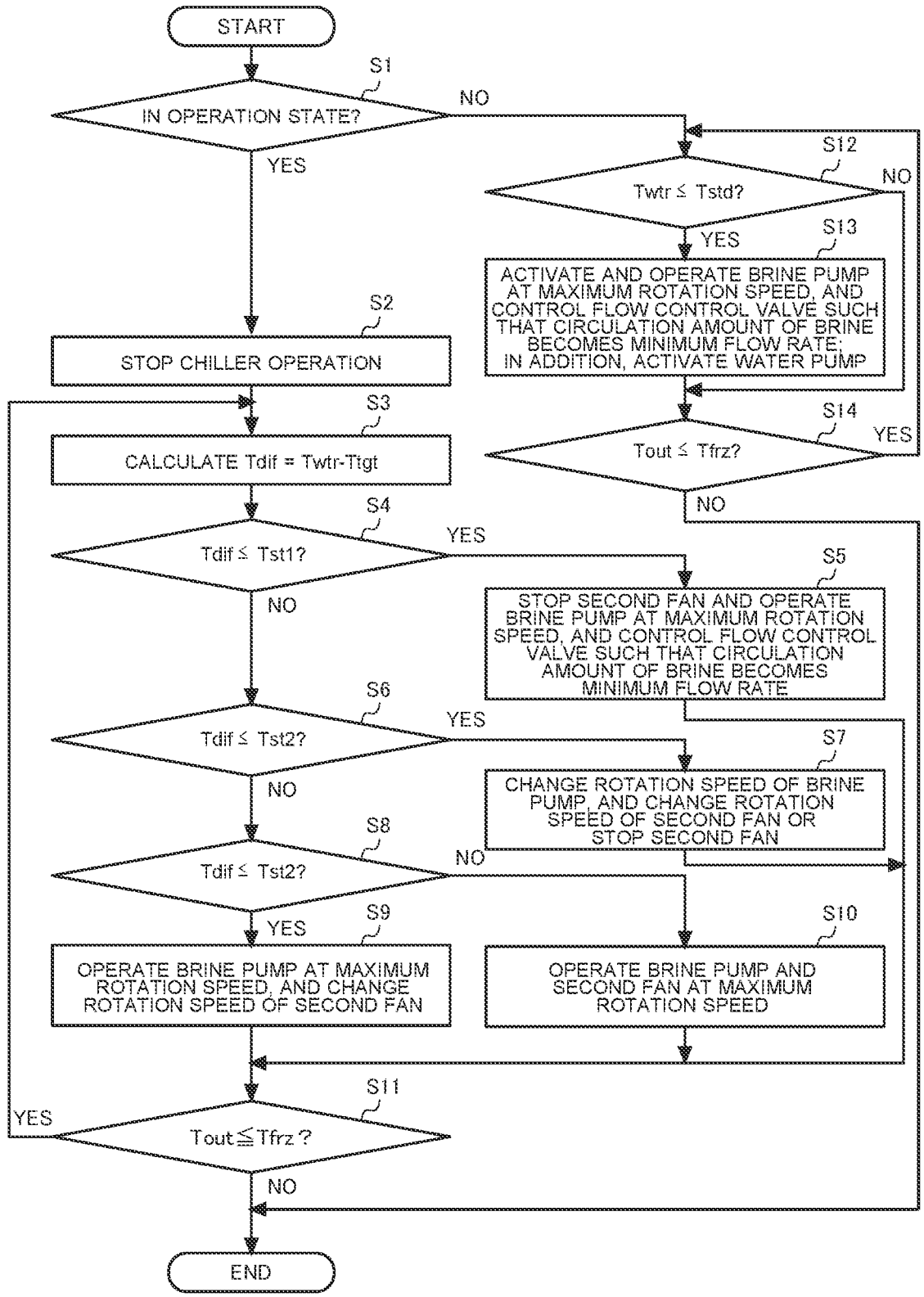
FIG. 2 is a flow chart of control for preventing freezing of brine used in the brine circuit of the embodiment of the present disclosure.

FIG. 2 illustrates a flow chart of control for preventing freezing of brine used in the brine circuit of the embodiment of the present disclosure.

Next, control for preventing freezing of the brine used in the brine circuit 20 of the free cooling outdoor unit 100 (hereinafter, referred to as a "brine freezing prevention control") will be described with reference to FIG. 2. This brine freeze prevention control is performed when the outside air temperature Tout detected by the outside air temperature sensor 40 is lower than the freezing temperature Tfrz (e.g., −5 degrees C.) of the brine used in the brine circuit 20, i.e., under conditions where the brine may be frozen. Instead of the conditions described above, the brine freeze prevention control may be performed when the brine temperature Tbrn detected by the brine temperature detection sensor 26 is lower than or equal to the brine freezing temperature Tfrz (e.g., −5 degrees C.) plus an offset temperature (e.g., 2 degrees C.).

(Step S1)

The controller 50 determines whether the free cooling outdoor unit 100 is in an operation state. If the controller 50 determines that the free cooling outdoor unit 100 is in an operation state, the process proceeds to step S2. On the other hand, if the controller 50 determines that the free cooling outdoor unit 100 is not in an operation state, that is, in a cut-off state, the process proceeds to step S12. Here, the cut-off state is a state in which the free cooling outdoor unit 100 is energized, but the compressor 11, the brine pump 21, and the water pump 31 are all stopped, and the first fan 16 and the second fan 25 are also stopped.

(Step S2)

The controller 50 stops the compressor 11 and the first fan 16, to thereby stop the chiller operation and perform free cooling operation only.

(Step S3)

The controller 50 calculates the difference Tdif (=Twtr−Ttgt) between the water temperature Twtr detected by the water temperature detection sensor 32 and the target water temperature Ttgt (e.g., 10 degrees C.) of cooling water flowing through the water circuit 30 that has been set in advance.

(Step S4)

The controller 50 determines whether the difference Tdif is less than or equal to the first reference temperature difference Tst1 (e.g., 0 degrees C.). If the controller 50 determines that the difference Tdif is less than or equal to the first reference temperature difference Tst1, the process proceeds to step S5. On the other hand, if the controller 50 determines that the difference Tdif is greater than the first reference temperature difference Tst1, the process proceeds to step S6.

(Step S5)

The controller 50 stops the second fan 25, operates the brine pump 21 at the maximum rotation speed and controls the opening degree of the flow regulating valve 23 so that the brine circulation volume is at the minimum flow rate. Here, since the water temperature Twtr is lower than the target water temperature Ttgt, i.e. no load is applied, there is no need for brine to be heat exchanged by the second heat exchanger 22 and the second water heat exchanger 24. However, since the outside air temperature Tout is below the freezing temperature Tfrz of the brine, stopping the brine pump 21 may cause the temperature of the brine to fall below the freezing temperature Tfrz and freeze. Therefore, by controlling the second fan 25, the brine pump 21, and the flow control valve 23 as described above, the amount of heat exchange by the second heat exchanger 22 is reduced as much as possible, and the heat generated by operating the brine pump 21 is transferred to the brine. In this way, the temperature of the brine is prevented from falling below the freezing temperature Tfrz, and freezing of the brine can be prevented. Operating the brine pump 21 at the maximum speed is aimed at increasing the amount of heat transferred to the brine as much as possible in order to prevent the brine from freezing.

(Step S6)

The controller 50 determines whether the difference Tdif is less than or equal to the second reference temperature difference Tst2 (e.g., 2 degrees C.). If the controller 50 determines that the difference Tdif is less than or equal to the second reference temperature difference Tst2, the process proceeds to step S7. On the other hand, if the controller 50 determines that the difference Tdif is greater than the second reference temperature difference Tst2, the process proceeds to step S8. The second reference temperature difference Tst2 is larger than the first reference temperature difference Tst1.

(Step 7)

The controller 50 controls the brine pump 21 and the second fan 25 so that the water temperature Twtr detected by the water temperature detection sensor 32 is the target water temperature Ttgt. Specifically, the controller 50 controls the number of revolutions of the brine pump 21 so as to adjust the circulation amount of brine as well as the number of revolutions of the second fan 25, to thereby control the amount of outdoor air sent to the second heat exchanger 22. Since the difference between the water temperature Twtr and the target water temperature Ttgt is very small and hence the load is minimum, the number of revolutions of the brine pump 21 fluctuates and the number of revolutions of the second fan 25 fluctuates, including the stopping of the second fan 25. Instead of controlling the speed of the brine pump 21, the circulation amount of brine may be adjusted by keeping the speed of the brine pump 21 constant and controlling the flow control valve 23.

(Step S8)

The controller 50 determines whether the difference Tdif is less than or equal to the third reference temperature difference Tst3 (e.g., 5 degrees C.). If the controller 50 determines that the difference Tdif is less than or equal to the third reference temperature difference Tst3, the process proceeds to step S9. On the other hand, if the controller 50 determines that the difference Tdif is greater than the third reference temperature difference Tst3, the process proceeds to step S10. The third reference temperature difference Tst3 is larger than the second reference temperature difference Tst2.

(Step S9)

The controller 50 controls the brine pump 21 and the second fan 25 so that the water temperature Twtr detected by the water temperature detection sensor 32 is the target water temperature Ttgt. To be more specific, the controller 50 controls the rotation speed of the brine pump 21 to control the circulation amount of brine, and controls the rotation speed of the second fan 25 to control the amount of outside air to be sent to the second heat exchanger 22. At this point of time, since the difference between the water temperature Twtr and the target water temperature Ttgt is very small and hence the load is low, the number of revolutions of the brine pump 21 fluctuates and the number of revolutions of the second fan 25 fluctuates. Instead of controlling the speed of the brine pump 21, the circulation amount of brine may be adjusted by keeping the speed of the brine pump 21 constant and controlling the flow control valve 23.

(Step S10)

The controller 50 controls the brine pump 21 and the second fan 25 so that the water temperature Twtr detected by the water temperature detection sensor 32 is the target water temperature Ttgt. To be more specific, the controller 50 controls the number of revolutions of the brine pump 21, to thereby adjust the amount of brine circulation as well as the number of revolutions of the second fan 25 so as to control the amount of outdoor air sent to the second heat exchanger 22. At this point of time, the brine pump 21 and the second fan 25 are fixed at the maximum rotation speed because of the high load with a large difference between the water temperature Twtr and the target water temperature Ttgt. Instead of controlling the rotational speed of the brine pump 21, the amount of brine circulation may be adjusted by keeping the rotational speed of the brine pump 21 constant and controlling the flow control valve 23.

(Step S11)

The controller 50 determines whether the outside air temperature Tout detected by the outside air temperature sensor 40 is less than or equal to the freezing temperature Tfrz (e.g., −5 degrees C.) of the brine used in the brine circuit 20. If the controller 50 determines that the outside air temperature Tout is lower than or equal to the freezing temperature Tfrz of the brine, the process returns to step S3. On the other hand, if the controller 50 determines that the outside air temperature Tout is greater than the freezing temperature Tfrz of the brine, the brine freeze prevention control is terminated. Instead of the above determination, the controller 50 may determine whether the brine temperature Tbrn detected by the brine temperature detection sensor 26 is lower than or equal to the brine freezing temperature Tfrz (e.g., −5 degrees C.) plus an offset temperature (e.g., 2 degrees C.).

(Step S12)

The controller 50 determines whether the water temperature Twtr is equal to or lower than the pre-set reference temperature Tstd (e.g., 5 degrees C.). If the controller 50 determines that the water temperature Twtr is less than or equal to the reference temperature Tstd, the process proceeds to step S13. On the other hand, if the controller 50 determines that the Twtr is greater than the reference temperature Tstd, the process proceeds to step S14.

(Step S13)

The controller 50 activates he brine pump 21 and operates it at the maximum rotation speed, and controls the opening degree of the flow control valve 23 such that the circulation amount of brine becomes the minimum flow rate. To prevent freezing of water, the controller 50 also activates the water pump 31 to cause water in the water circuit 30 to circulate. At this point of operation, the water temperature Twtr is equal to or lower than the freezing temperature Tfrz of brine and hence, there is a possibility that brine freezes when any other additional operation is not performed. Further, the outside air temperature Tout is equal to or lower than the freezing temperature Tfrz of brine. Therefore, when brine is subject to heat exchange by the second heat exchanger 22, the temperature of the brine decreases. In view of the above, the amount of heat exchange by the second heat exchanger 22 is reduced to as small an amount as possible by controlling the brine pump 21, the water pump 31, and the flow control valve 23 as described above, and heat generated due to the operation of the brine pump 21 is applied to brine. Further, by operating the brine pump 21 and the water pump 31, the second water heat exchanger 24 causes heat exchange to be performed between brine and water flowing through the water circuit 30, so that heat is transferred to the brine from the water. With such a configuration, it is possible to prevent the temperature of brine from reaching a temperature equal to or lower than the freezing temperature Tfrz and hence, freezing of brine can be prevented. The reason why the brine pump 21 is operated at the maximum speed is to increase the amount of heat transferred to the brine as much as possible in order to prevent the brine from freezing. (Step S14)

The controller 50 determines whether the outside air temperature Tout detected by the outside air temperature sensor 40 is lower than or equal to the freezing temperature Tfrz (e.g., −5 degrees C.) of brine used in the brine circuit 20. If the controller 50 determines that the outside air temperature Tout is lower than or equal to the freezing temperature Tfrz of brine, the process returns to step S12. On the other hand, if the controller 50 determines that the outside air temperature Tout is greater than the freezing temperature Tfrz of brine, the brine freeze prevention control is terminated. Instead of the above determination, the controller 50 may determine whether the brine temperature Tbrn detected by the brine temperature detection sensor 26 is less than or equal to the brine freezing temperature Tfrz (e.g., −5 degrees C.) plus an offset temperature (e.g., 2 degrees C.).

By performing brine freezing prevention control as described above, the brine is prevented from freezing even when the outside air temperature Tout is below the brine freezing temperature Tfrz. By doing so, brine with a lower concentration than that of related-art brine can be used in the brine circuit 20, whereby the heat exchange efficiency is improved and the viscosity is lowered. As a result, the brine can be prevented from freezing and energy efficiency can be improved.

The free cooling outdoor unit 100 of Embodiment includes a refrigerant circuit 10 in which the compressor 11, the first heat exchanger 12, the throttle device 13, and the refrigerant flow passage of the first water heat exchanger 14 are connected serially by pipes to cause refrigerant to circulate therein. The free cooling outdoor unit 100 also includes a brine circuit 20 in which the brine pump 21, the second heat exchanger 22, and the brine flow passage of the second water heat exchanger 24 are serially connected by pipes to cause the brine to circulate therein. The free cooling outdoor unit 100 also includes a water circuit 30 in which the water pump 31, the water flow passage of the second water heat exchanger 24, and the water flow passage of the first water heat exchanger 14 are serially connected by pipes to cause water to circulate therein. The free cooling outdoor unit 100 includes a fan for sending air to the second heat exchanger 22, a flow control valve 23 for adjusting the circulation amount of brine in the brine circuit 20, a water temperature detection sensor 32 for detecting the water temperature of the water circuit 30, and an outdoor air temperature sensor 40 for detecting the outdoor air temperature. The free cooling outdoor unit 100 also includes a controller 50 that controls the circulation amount of brine so that the brine temperature does not fall below the brine freezing temperature based on the water temperature of the water circuit 30 when the outside air temperature is lower than the brine freezing temperature.

According to the free-cooling outdoor unit 100 of Embodiment, when the outside air temperature is lower than the brine freezing temperature, the circulation amount of brine is controlled so that the brine temperature does not fall below the brine freezing temperature based on the water temperature of the water circuit 30. As a result, the brine concentration in the brine circuit 20 can be lower than that in the past, whereby brine freezing can be prevented and energy efficiency is improved.

REFERENCE SIGNS LIST 10 refrigerant circuit 11 compressor 12 first heat exchanger 13 expansion device 14 first water heat exchanger 15 accumulator 16 first fan 20 brine circuit 21 brine pump 22 second heat exchanger 23 flow control valve 24 second water heat exchanger 25 second fan 26 brine temperature detection sensor 30 water circuit 31 water pump 32 water temperature detection sensor 40 outside air temperature sensor 50 controller 100 free cooling outdoor unit.

The invention claimed is:

1. A free cooling outdoor unit comprising:
a refrigerant circuit where a compressor, a first heat exchanger, a throttle device, and a refrigerant flow passage of a first water heat exchanger are connected by pipes so as to cause refrigerant to circulate therein;
a brine circuit where a brine pump, a second heat exchanger, and a brine flow passage of a second water heat exchanger are connected by pipes so as to cause brine to circulate therein;
a water circuit where a water pump, a water flow passage of the second water heat exchanger, and a water flow passage of the first water heat exchanger are connected by pipes so as to cause water to circulate therein;
a fan configured to send air to the second heat exchanger;
a flow control valve configured to control a circulation amount of the brine in the brine circuit;
a water temperature detection sensor configured to detect a water temperature in the water circuit;
an outside air temperature sensor configured to detect an outside air temperature; and
a controller configured to control, in a case where the outside air temperature is equal to or lower than a freezing temperature of the brine, the circulation amount of the brine based on the water temperature such that a brine temperature is prevented from reaching a temperature equal to or lower than the freezing temperature of the brine.

2. The free cooling outdoor unit of claim 1, wherein
in a case where the free cooling outdoor unit is in an operation state, and the controller determines that the outside air temperature is equal to or lower than the freezing temperature of the brine, and a difference between the water temperature and a target water temperature set in advance is equal to or less than a first reference temperature difference, the controller stops the fan and operates the brine pump at a maximum allowable rotation speed, and controls an opening degree of the flow control valve such that the circulation amount of the brine becomes a minimum allowable flow rate.

3. The free cooling outdoor unit of claim 2, wherein in a case where the free cooling outdoor unit is in the operation state, and the controller determines that the outside air temperature is equal to or lower than the freezing temperature of the brine and the difference between the water temperature and the target water temperature is greater than the first reference temperature difference and is equal to or less than a second reference temperature difference that is greater than the first reference temperature difference, the controller controls the fan and the brine pump or the flow control valve such that the water temperature reaches the target water temperature.

4. The free cooling outdoor unit of claim 1, wherein in a case where the free cooling outdoor unit is in an off stopped state, and the controller determines that the outside air temperature is equal to or lower than the freezing temperature of the brine, and the water temperature is equal to or lower than a reference temperature, the controller activates the brine pump and the water pump, and the controller operates the brine pump at the maximum allowable rotation speed, and controls the opening degree of the flow control valve such that the circulation amount of the brine becomes a minimum allowable flow rate.

5. The free cooling outdoor unit of claim 2, wherein in a case where the free cooling outdoor unit is in an off stopped state, and the controller determines that the outside air temperature is equal to or lower than the freezing temperature of the brine, and the water temperature is equal to or lower than a reference temperature, the controller activates the brine pump and the water pump, and the controller operates the brine pump at the maximum allowable rotation speed, and controls the opening degree of the flow control valve such that the circulation amount of the brine becomes a minimum allowable flow rate.

6. The free cooling outdoor unit of claim 3, wherein in a case where the free cooling outdoor unit is in an off stopped state, and the controller determines that the outside air temperature is equal to or lower than the freezing temperature of the brine, and the water temperature is equal to or lower than a reference temperature, the controller activates the brine pump and the water pump, and the controller operates the brine pump at the maximum allowable rotation speed, and controls the opening degree of the flow control valve such that the circulation amount of the brine becomes a minimum allowable flow rate.

* * * * *